United States Patent Office 2,868,907
Patented Jan. 13, 1959

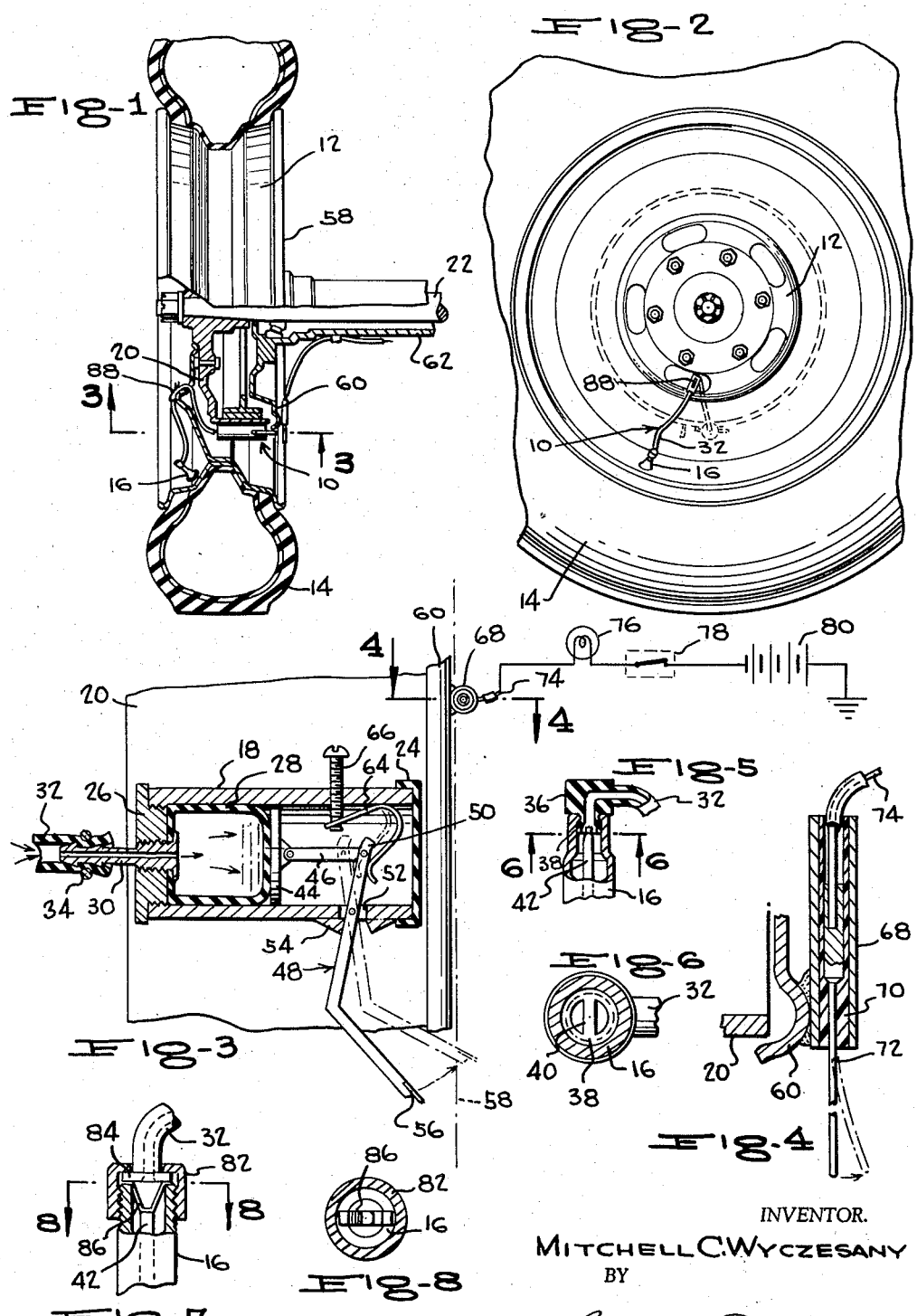

2,868,907

TIRE PRESSURE INDICATING DEVICE

Mitchell C. Wyczesany, Chicago, Ill.

Application March 7, 1958, Serial No. 719,790

3 Claims. (Cl. 200—61.25)

The present invention relates to a pressure indicating device for the tires of a vehicle.

An object of the present invention is to provide a tire pressure indicating device which lends itself to ready installation upon the wheel of a vehicle and to ready attachment to and detachment from the valve stem of a tire carried by the wheel of the vehicle.

Another object of the present invention is to provide a tire pressure indicating device which is sturdy in construction, simple in structure, one economical to manufacture and assemble, and one which is highly effective in action.

These and other objects and advantages of the present invention will be fully apparent from the following description when taken in conjunction with the annexed drawing, in which:

Figure 1 is a fragmentary sectional view of a wheel and tire of a vehicle, shown mounted upon the end portion of an axle housing, a portion of the tire being shown broken away;

Figure 2 is an elevational view of the assembly shown in Figure 1;

Figure 3 is a fragmentary sectional view, on an enlarged scale, taken on the line 3—3 of Figure 1;

Figure 4 is a fragmentary sectional view, on an enlarged scale, taken on the line 4—4 of Figure 3;

Figure 5 is a fragmentary sectional view of a means for attaching the device of the present invention to the valve stem of the vehicle tire;

Figure 6 is a sectional view, on an enlarged scale, taken on the line 6—6 of Figure 5;

Figure 7 is a fragmentary sectional view of another means for attachment of the device of the present invention to the valve stem; and Figure 8 is a sectional view taken on the line 8—8 of Figure 7.

Referring in greater detail to the drawing, in which like numerals indicate like parts throughout the several views, the tire pressure indicating device of the present invention is designated generally in Figures 1 and 2 by the reference numeral 10. The device 10 is shown in Figures 1 and 2 to be mounted upon a wheel 12 having a tire 14, the tire 14 having a valve stem 16.

The device 10 includes a tubular member 18 arranged exteriorly of and secured to the periphery of a brake drum 20 carried on the free end portion of an axle 22 of the vehicle. The tubular member 18 is so positioned as to be in parallel spaced relation with respect to the axle 22.

The tubular member 18 is hollow and open-ended and is closed at one end by a cap 24 and at the other end by a plug 26. A deflatable and inflatable sac 28, fabricated of rubber or other resilient material, is positioned within the tubular member adjacent the plug 26. A nipple 30 extends through the plug 26.

One end portion of the nipple 30 is threaded and is threadedly engaged in a threaded bore provided in the plug 26. The other end of the nipple 30 is provided with annular ridges grippingly engaging the internal wall of a flexible tube member 32 which is secured to the ridged portion of the nipple 30 by means of a clamping ring 34. The interior of the nipple 30 is connected at one end with the interior of the sac 28 and the other end is connected with the interior of the tubular member 32.

The other end of the tube or tubular member 32 is connected, as shown in Figures 2, 5 and 6, to the inlet end of the valve stem 16. An enlarged portion 36 on the one end of the tubular member 32 has a nipple 38 dependingly secured thereto and insertable in the open upper end of the valve stem 16, as shown in Figure 5. The nipple 38 has a bridge element 40 (Figure 6) engaging the valve release rod 42, depressing the latter and allowing the pressure within the tire 14 to be the same as that within the sac 28.

A piston 44 is interposed between the cap 24 on one end of the tubular member 18 and the sac 28 and bears against the sac 28. The piston 44 is slidable within the tubular member 18 from the full line position shown in Figure 3 to the dotted line position responsive to deflation of the sac 28. A link 46 connects the side of the piston 44 remote from the sac 28 to one end of the lever 48 for movement of the lever 48 with the piston 44. The portion 50 of the lever 48 inwardly of the one end connected to the link 46 extends through an aperture 52 provided in the side of the tubular member 18 inwardly of and spaced from the one end closed by the cap 24. A pin 54 extends across the aperture 52 and connects the lever 48 intermediate its ends to the tubular member 18 for swinging movement of the lever 48 from a position in which the other end portion 56 is inwardly of and spaced from the adjacent side of the wheel 12, as shown in full lines in Figure 3, to a position shown in dotted lines in Figure 3 in which the portion 56 is contiguous to the adjacent side of the wheel 12, such wheel side being designated by a dotted line designated by the reference numeral 58. Such side of the wheel 12 is substantially coplanar with the highest part of the exterior face of the brake drum backing plate 60 which is carried on the free end of the axle housing 62 surrounding the axle 22.

A U-shaped leaf spring 64 is positioned within the tubular member 18 inwardly of and spaced from the cap 24 and has one of its legs arcuately curved to provide a contact surface bearing against the adjacent portion 50 of the lever 48, as shown in Figure 3. The free end portion of the other leg of the spring 64 is slotted (not shown) so as to receive a reduced portion on one end of an adjustment bolt 66 threadedly engaged in a threaded bore provided in the side of the tubular member 18 opposite to the aperture 52. The leaf spring 64 constitutes spring means operatively connected to the piston 44 for biasing the piston 44 against the adjacent end of the sac 28. The bolt 66 constitutes adjustment means for varying the tension of the spring 64 in order that the lever 48 be caused to execute its movement from the position inwardly of the wheel side to the position contiguous to or projecting slightly outwardly of the wheel side responsive to a predetermined drop in pressure within the tire 14 and subsequent collapsing of the sac 28 an amount proportionate to the drop in pressure within the tire 14.

As shown in Figures 3 and 4, a metallic sleeve 68 is welded to the exterior face of the backing plate 60 and carries within a tube insulating member 70 supporting a flexible contact member 72 having a portion projecting below or outwardly of the one end of the sleeve 68. An insulated wire 74 extends into the other end of the sleeve 68 and is electrically connected to the contact 72. As shown diagrammatically in Figure 3, the wire 74 is in circuit with a signal lamp 76, the ignition switch 78 of the automobile or other vehicle in which the device of the present invention is installed, and the battery 80 of the automobile or vehicle.

In Figures 7 and 8, a modified form of the means connecting the tubular member 32 to the valve stem 16 is shown. This means includes a screw cap 82 threaded on the threaded end portion of the valve stem 16 and surrounding a collar 84 formed integrally with the end of the tubular member 32. A bridge element 86 depends from the collar 84 and bears against the free end of the valve actuating rod 42 within the valve stem 16 to open the latter.

In operation, upon diminishing of pressure within the tire 14 due to any reason, the sac 28 will become deflated to the extent necessary to shift the piston 44 within the tubular member 18 in the direction toward the plug 26 so as to cause, through the link 46, the swinging movement of the lever 48 to the position in which the end portion 56 travels in a path which is intercepted by the free end portion of the flexible contact 72 carried by the drum backing plate 60. As one side of the battery 80 is grounded in the vehicle frame and the lever 48 is likewise grounded, this contact of the lever end portion 56 with the contact 72 will cause the signal lamp 76 to be illuminated, thereby informing the operator of the vehicle that there has been a drop of pressure within the tire 14.

A spring clip 88 is mounted on the wall of one of the rim openings in the wheel 12 and supports the midpart of the conduit 32 where the latter extends from one side of the wheel to the other and would be subject to abrasion and wear if not supported.

What is claimed is.

1. In a vehicle having a wheel, and a tire having a valve stem and inflatable by air under pressure mounted upon said wheel, a hollow open-ended tubular member carried by said wheel, a cap closing one of the open ends of said member, a plug closing the other of the open ends of said member, a deflatable and inflatable sac positioned within said tubular member adjacent said plug, a nipple in said plug and having one end in communication with the interior of said sac and the portion adjacent the other end exteriorly of said plug, a flexible tube connecting the other end of said nipple to said valve stem, a piston interposed between said sac and said cap and slidable within said tubular member and bearing against said sac, a lever extending transversely into the portion of said tubular member between said piston and said cap and connected intermediate its ends to said tubular member for swinging movement, one end of said lever being within said tubular member and connected to said piston for movement with the latter, the other end of said lever when said sac is fully inflated being inwardly of and spaced from the adjacent side of said wheel, said lever being swingable from the aforesaid position to a position in which the other end of said lever is contiguous to said adjacent wheel side upon sliding movement of said piston toward said plug responsive to deflation of said sac, the other end of said lever when in the position contiguous to said adjacent wheel side being adapted to contact a fixed contact carried by said vehicle.

2. In a vehicle having a wheel, and a tire having a valve stem and inflatable by air under pressure mounted upon said wheel, a hollow open-ended tubular member carried by said wheel, a cap closing one of the open ends of said member, a plug closing the other of the open ends of said member, a deflatable and inflatable sac positioned within said tubular member adjacent said plug, a nipple in said plug and having one end in communication with the interior of said sac and the portion adjacent the other end exteriorly of said plug, a flexible tube connecting the other end of said nipple to said valve stem, a piston interposed between said sac and said cap and slidable within said tubular member and bearing against said sac, a lever extending transversely into the portion of said tubular member between said piston and said cap and connected intermediate its ends to said tubular member for swinging movement, one end of said lever being within said tubular member and connected to said piston for movement with the latter, the other end of said lever when said sac is fully inflated being inwardly of and spaced from the adjacent side of said wheel, and spring means operatively connected to said piston for biasing said piston against said sac, said lever being swingable from the aforesaid position to a position in which the other end of said lever is contiguous to said adjacent wheel side upon sliding movement of said piston toward said plug responsive to deflation of said sac, the other end of said lever when in the position contiguous to said adjacent wheel side being adapted to contact a fixed contact carried by said vehicle.

3. In a vehicle having a wheel, and a tire having a valve stem and inflatable by air under pressure mounted upon said wheel, a hollow open-ended tubular member carried by said wheel, a cap closing one of the open ends of said member, a plug closing the other of the open ends of said member, a deflatable and inflatable sac positioned within said tubular member adjacent said plug, a nipple in said plug and having one end in communication with the interior of said sac and the portion adjacent the other end exteriorly of said plug, a flexible tube connecting the other end of said nipple to said valve stem, a piston interposed between said sac and said cap and slidable within said tubular member and bearing against said sac, a lever extending transversely into the portion of said tubular member between said piston and said cap and connected intermediate its ends to said tubular member for swinging movement, one end of said lever being within said tubular member, a link connecting said one end of said lever to said piston for movement of said lever with said piston, the other end of said lever when said sac is fully inflated being inwardly of and spaced from the adjacent side of said wheel, a leaf spring having one end adjustably anchored in said tubular member and having the other end bearing against said one lever end for biasing said piston against said sac, said lever being swingable from the aforesaid position to a position in which the other end of said lever is contiguous to said adjacent wheel side upon sliding movement of said piston toward said plug responsive to deflation of said sac, the other end of said lever when in the position contiguous to said adjacent wheel side being adapted to contact a fixed contact carried by said vehicle.

References Cited in the file of this patent
UNITED STATES PATENTS

| | | |
|---|---|---|
| 2,481,534 | Robertson | Sept. 13, 1949 |
| 2,714,636 | Trinca | Aug. 2, 1955 |